United States Patent [19]
James et al.
[11] 3,824,344
[45] July 16, 1974

[54] CONFERENCE BRIDGE CIRCUIT

[75] Inventors: Dennis Bryan James, Rumson; James Royce McEowen, Holmdel Township, Monmouth County, both of N.J.

[73] Assignee: Bell Telephone Laboratories, Incorporated, Murray Hill, N.J.

[22] Filed: Mar. 22, 1973

[21] Appl. No.: 343,826

[52] U.S. Cl. 179/1 CN, 179/170 D
[51] Int. Cl. H04m 3/56
[58] Field of Search 179/1 CN, 18 BC, 170 D; 333/11

[56] References Cited
UNITED STATES PATENTS

| | | | |
|---|---|---|---|
| 3,060,265 | 10/1962 | Duncan et al. | 179/1 CN |
| 3,108,157 | 10/1963 | Feiner | 179/1 CN |
| 3,511,931 | 5/1970 | Van Buren | 179/1 CN |
| 3,524,929 | 8/1970 | Burns et al. | 179/1 CN |
| 3,761,624 | 9/1973 | Lewis et al. | 179/1 CN |

*Primary Examiner*—Kathleen H. Claffy
*Assistant Examiner*—Douglas W. Olms
*Attorney, Agent, or Firm*—David H. Tannenbaum

[57] ABSTRACT

A conference bridge is devised having substantially uniform transmission between two pairs of ports, each port connected to a two-wire telephone station. Internal conversion from two-wire to four-wire and from four-wire back to two-wire at each pair of ports is accomplished using a single hybrid employing differential amplifiers. Provision is made to couple additionl hybrids, each serving two stations, to the conference bridge via a summation circuit in the four-wire portion of the bridge.

10 Claims, 3 Drawing Figures

CONFERENCE BRIDGE CIRCUIT

BACKGROUND OF THE INVENTION

This invention relates to a conference bridge circuit and, more particularly, to a conference bridge circuit wherein two-wire to four-wire conversion is accomplished by amplifiers internal to the bridge.

The need for such a conference bridge for establishing communication connections between a plurality of stations is certainly well recognized. In the past, several such bridge circuits have been developed, each based upon certain operational criteria. In some such circuits, voice-switching techniques are employed such that only the station having the greatest energy output can transmit to the other stations connected to the bridge. Such a bridge circuit is disclosed in U.S. Pat. No. 3,524,929 of R. V. Burns, issued Aug. 18, 1970.

Phase cancellation is another method employed to accomplish conferencing. When it is desired to conference two-wire stations, provision must be made to insert a hybrid circuit in each port of the bridge in order to obtain the necessary two-wire to four-wire conversion. An example is the circuit disclosed in U.S. Pat. No. 3,511,931 to N. S. Van Buren, issued May 12, 1970.

In some prior art circuits, hybrids for accomplishing the required two-wire to four-wire conversion have been built into the bridge. Such an arrangement is taught by U.S. Pat. No. 3,108,157 to A. Feiner, issued Oct. 22, 1963. In Feiner, the hybrid which couples the telephone lines to the bridge is a mechanical inductance device having the inherent problem that extremely predictable and controllable coupling is required between the various inductance coils. Although, in practice, it has been possible to achieve such coupling, this result has been obtained at the sacrifice of cost, size and weight.

Accordingly, it is desired to provide a conference bridge circuit having low cost and simplified operation.

It is further required to provide such a conference bridge on a two-wire basis, without mechanical hybrids, and without sacrificing full bidirectional capabilities.

SUMMARY OF THE INVENTION

In the application of T. G. Lewis, Ser. No. 343,825, filed concurrently herewith, there is disclosed a time division switching network having an operational amplifier hybrid for converting from the two-wire portions to the four-wire portions of the system. In Lewis, each hybrid is connected to a single two-wire line, which line in turn is connected to a single telephone station. The hybrids are connected together via a four-wire time division bus. Each hybrid therefore serves a single line and that line is balanced by an impedance at the input to the hybrid.

We have found that, by replacing the impedance at each hybrid with a transformer coupling to a telephone station, each hybrid can be made to serve two two-wire lines. If, then, the time division switches between the hybrids are eliminated and two hybrids are connected together, there emerges a four-port conference bridge having substantially uniform transmission between the ports.

Between the hybrids there is essentially four-wire operation, with each hybrid having an incoming signal bus and an outgoing signal bus. As discussed in the aforementioned Lewis application, the sum of the outgoing signals is formed in a summing circuit connected between the outgoing and incoming buses, and the sum is applied to each hybrid via the incoming bus.

Each hybrid includes first and second differential amplifiers. The first amplifier has a first input connected to the incoming bus, a second input coupled to the output of the second amplifier, and an output coupled to a series pair connection of the two communication paths served by the associated hybrid. The first amplifier is operative to cancel the communication path outgoing signal portion of the sum appearing on said first input with the communication path outgoing signal from the second amplifier output on said second input and to apply the other selected communication path signals to the associated communication paths.

The second amplifier of each hybrid has a first input coupled to the series pair connection of the two communication paths, a second input coupled to the first amplifier output, and an output coupled to the outgoing bus. The second amplifier is operative to cancel the other selected communication path signals on the communication path appearing on the first input with the first amplifier output signal appearing on the second input and to apply the resulting communication path outgoing signal to the outgoing bus.

According to one aspect of our invention then, each hybrid is arranged to serve two communication lines, each line serving a two-wire telephone station. Under this arrangement, a number of such hybrids is interconnected via a summation circuit, thereby forming a multiport communication bridge circuit.

Another aspect of our invention is the formation of a multiport communication bridge circuit adapted for serving a plurality of two-wire lines where the bridge circuit has integral thereto differential amplifier hybrids for converting from two-wire to four-wire operation.

DETAILED DESCRIPTION

Figure 1:
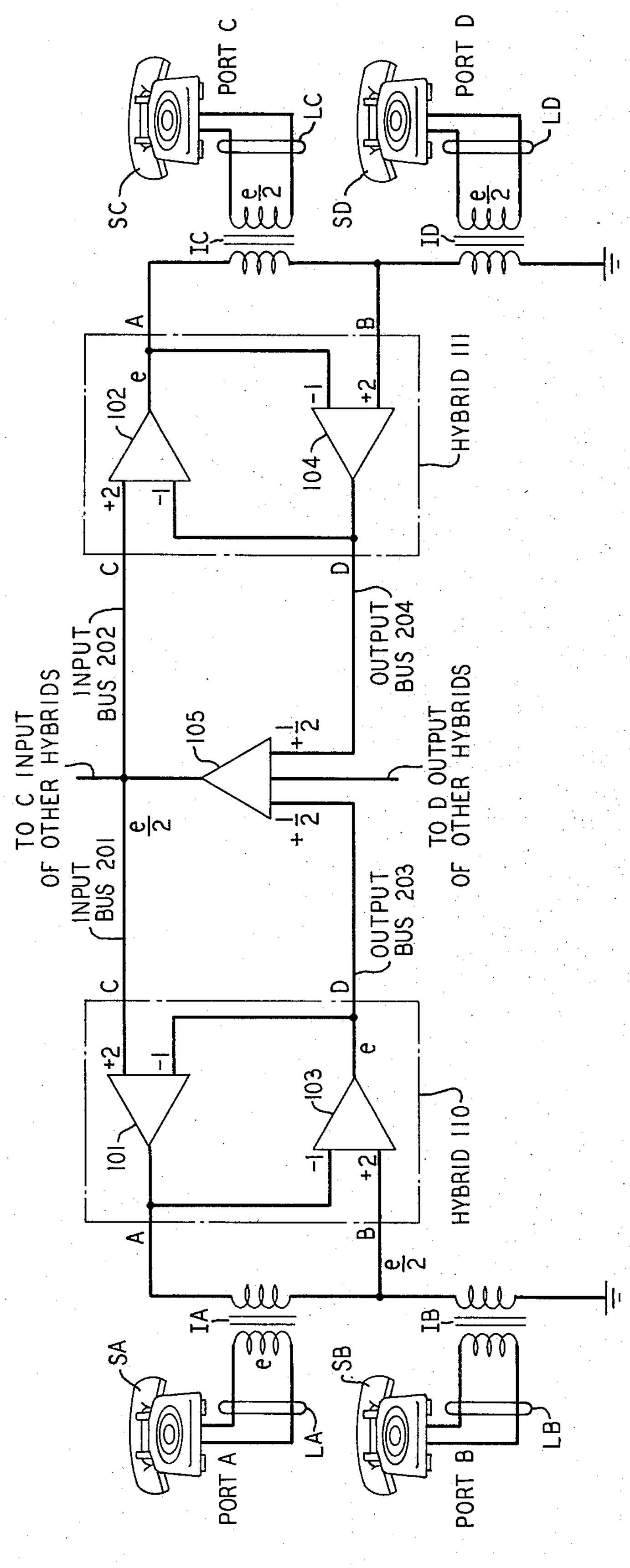
FIG. 1 shows a four-port bridge circuit illustrative of our invention.

FIG. 1 shows one embodiment of our invention wherein a four-port bridge is shown having ports A, B, C and D, each port connected to a telephone station, such as station SA, via a two-wire line, such as line LA. Each port includes a transformer, such as transformer IA, with one winding connected to the two-wire line and the other winding connected in series with a second transformer winding serving a second port. The series pair of transformer windings is then connected to the A and B inputs of a respective one of the two-wire to four-wire hybrids 110 and 111.

Digressing momentarily, it should be understood that transformers IA, IB, IC and ID are utilized in the embodiment for the purpose of providing battery feed to the telephone station; for the purpose of providing isolation, and for the further purpose of balancing the transmission lines LA, LB, LC and LD, all in conventional fashion. However, the use of transformer coupling is not necessary and the ports of the bridge can be connected directly to the associated hybrid terminals A and B.

As shown in FIG. 1, each hybrid is connected to a pair of ports and is effective to convert the two-wire communications from each of these ports to four-wire communication on the input buses 201 and 202 and the output buses 203 and 204. Summation amplifier 105, which may be arranged as an operational amplifier, is used to feed back signals from the output bus to the input bus in a manner to be more fully detailed hereinafter. Each hybrid, 110 and 111, includes a pair of operational amplifiers similar to the operational amplifier known as OP-AMP 741 and available from several well-known commercial suppliers. However, as will become more fully developed herein, any type of circuit whereby the signal arriving at one input is compared against a signal arriving at a second input to produce an output signal which is the difference of the two signals can be used in place of the operational amplifiers shown. As shown in the Figures, the positive input of an operational amplifier is the noninverting input while the negative input to an operational amplifier is an inverting input.

TRANSMISSION BETWEEN STATIONS SERVED BY THE SAME HYBRID

Continuing with respect to FIG. 1, transmission between station SA and station SB is accomplished in a straightforward manner over line LA from station SA and via transformers IA and IB and over line LB to station SB. This transmission is termed direct transmission and is fully bidirectional. Note that if the open circuit voltage on line LA is at a level *e*, then the signal appearing on line LB is *e*/2. This results from the voltage divider effect of the series combination of the impedances of the ports.

TRANSMISSION BETWEEN STATIONS SERVED BY DIFFERENT HYBRIDS

Assume now that station SA is communicating to the other stations connected to the bridge. Accordingly, an open-circuit signal voltage *e* from station SA appears at the B input of hybrid 110 at a level of *e*/2. This level results from the voltage divider effect of the series combination of the impedances of ports A and B. Since, as will be detailed hereinafter, the output of operational amplifier 101 is essentially at ground, the *e*/2 signal is amplified back to *e* by operational amplifier 103 and applied via the D output of hybrid 110 and output bus 203 to an input of summation amplifier 105. The signal is then attenuated to *e*/2 by summation amplifier 105 and applied to input buses 201 and 202.

The *e*/2 signal on bus 202 is applied to the C terminal of hybrid 111, amplified again to *e* by operational amplifier 102, and applied via the A output of hybrid 111 to transformers IC and ID. These transformers serve to split the signal back to *e*/2 on each of the lines LC and LD. Thus, a communication signal *e* which is generated at line LA is applied to lines LC and LD at a level of *e*/2. This, it will be recalled, is the same signal level as that which was applied to line LB from line LA. Accordingly, the signal level appearing at all ports from a given port is substantially uniform.

CONTROL OF FEEDBACK

The signal originating at station SA which appears on input bus 201 as *e*/2, in the manner discussed above, is amplified to *e* by operational amplifier 101. At the same time, however, the same signal *e* on the output of operational amplifier 103 is inverted to −'e by operational amplifier 101 and, thus, since the two inputs of operational amplifier 103 are equal and opposite in polarity, the output from operational amplifier 101 has no signal level and is essentially grounded. A purpose of operational amplifier 101 is to reduce to zero any signal originating from stations SA and SB.

The signal from the output of operational amplifier 102, which it will be recalled was at a level of *e*, is inverted to − *e* by operational amplifier 104. The *e*/2 signal appearing at terminal B of hybrid 111 is amplified to *e* by operational amplifier 104 and, thus, since the two input signals are equal and opposite, the output of operational amplifier 104 is essentially at ground level. As discussed above, the signal at terminal B has a value of *e*/2. The signal level is determined by the impedance match between ports C and D.

The transmission from station SB to stations SC and SD is identical with the transmission from station SA to those stations, with the exception that communication to and from station SB is via transformer IB as opposed to being via transformer IA. Since the disclosed bridge is fully symmetrical, transmission from any of the other stations is identical with the transmission just discussed.

ADDITIONAL STATIONS

When it is desired to add additional stations to the conference, a separate hybrid must be utilized. The added hybrid would be connected to a series pair of transformers each in turn connected via a two-wire line to a respective station. The D output of the added hybrid would be connected, as shown in FIG. 1, to an input of summation amplifier 105 while the output of the added hybrid would be connected to input buses 201 and 202. Full bidirectional communication would then be established between all of the stations connected to the bridge. Care must be taken in such an arrangement to insure that the gain through the summation amplifier 105 remains at ½ regardless of how many hybrids are added.

Figure 2:
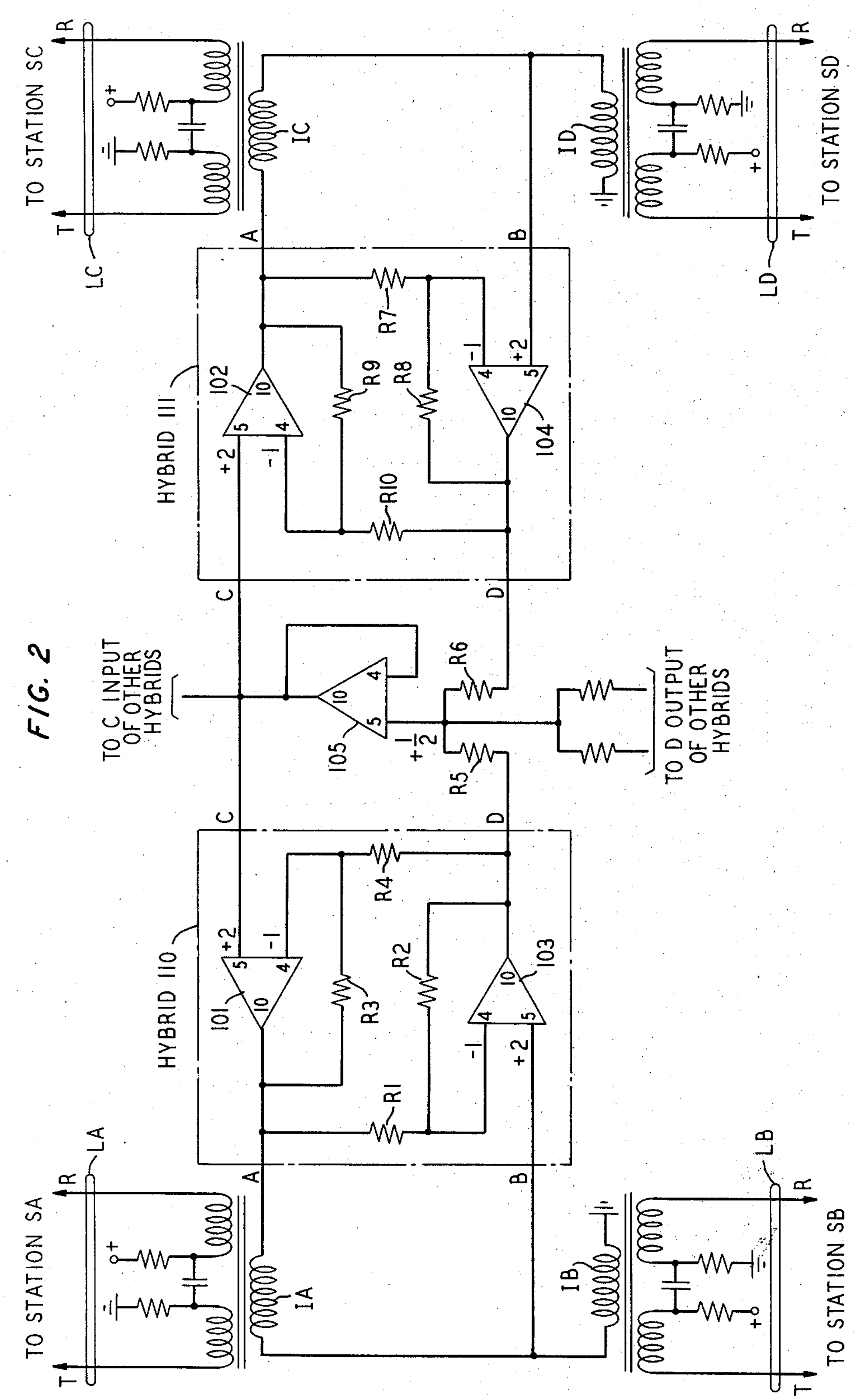
FIG. 2 shows the same four-port bridge in greater detail.

FIG. 2 shows a more detailed schematic of the hybrids 110 and 111 and the summation amplifier 105. In one embodiment of our invention, the value of each of the resistors associated with hybrids 110 and 111 and with summation amplifier 105 is 9,090 ohms with a tolerance of 1 percent. It will be noted that resistors R5 and R6 are utilized at the input of summation amplifier 105 to maintain the gain through that amplifier at ½.

Thus, in the specific embodiment shown, these resistors are equal, thereby attenuating the input to terminal 5 of summation amplifier 105 by ½. Terminal 4 of summation amplifier 105 is connected to the amplifier output in a manner to give a + 1 gain. Thus, the total gain through summation amplifier 105 is (1) (½) which equals ½. In the event an additional resistor is added, for example for a third hybrid, the signal would be attenuated ⅓. Thus, the other input to summation amplifier 105 would have to be adjusted to give a gain of 3/2 so that (1/3) (3/2) would equal the total gain through summation amplifier 105 of 1/2.

It is important to note that summation amplifier 105 can be replaced by a network of resistors which function to control the gain from the output bus to the input bus in a purely passive manner. The network of resistors would then act as a summing network to control transmission level. When such a network is utilized, the gain from the output bus through the amplifiers associated with each hybrid, such as amplifiers 101 and 102, would be adjusted by adjusting the positive input gain of those amplifiers to a value equal to the number of hybrid circuits utilized.

Figure 3:
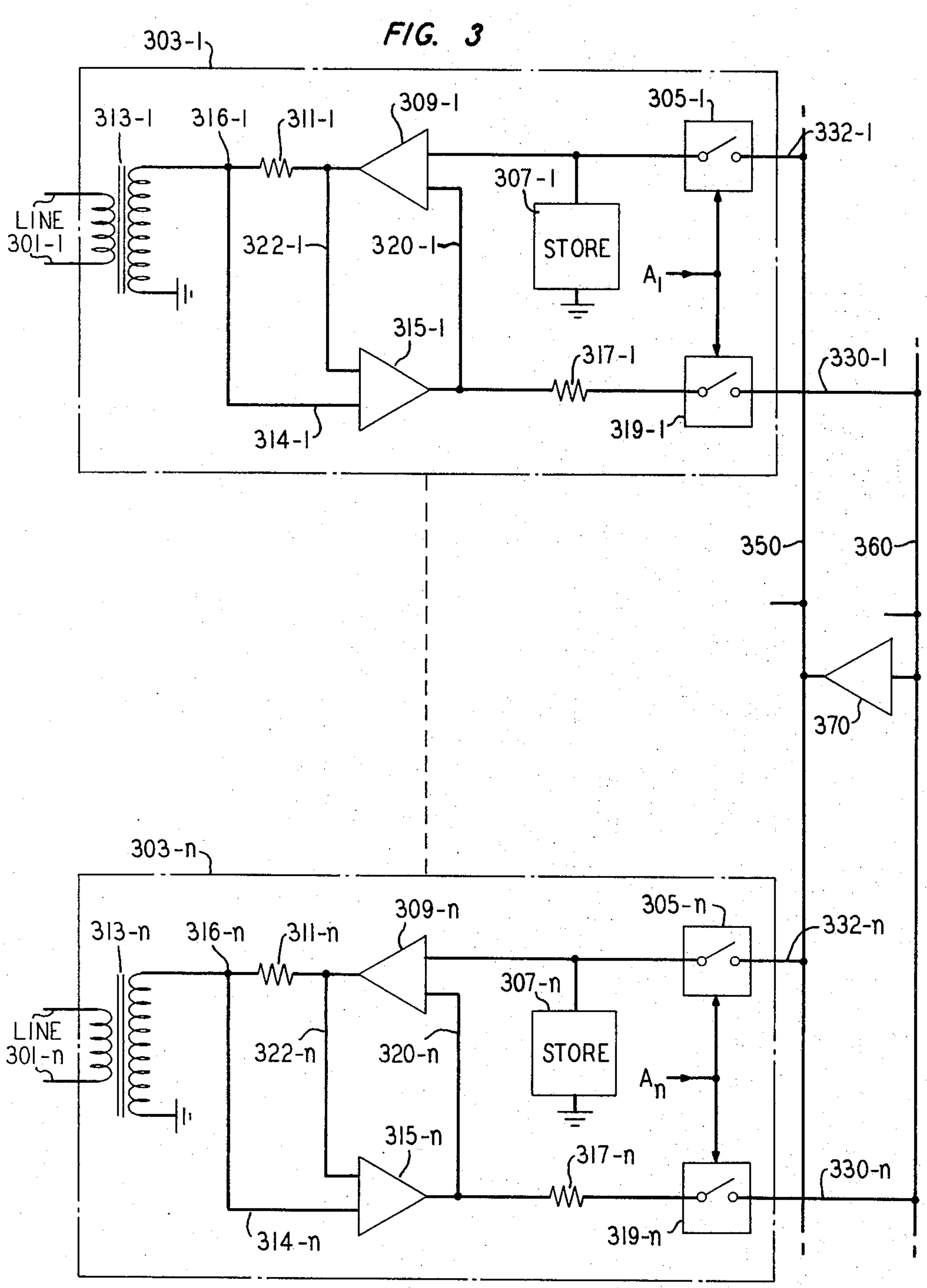
FIG. 3 shows a schematic diagram of two of the line circuits shown in the aforementioned copending application of T. G. Lewis.

The aforementioned T. G. Lewis application is detailed with respect to a circuit as shown in FIG. 3, with the exception that the matching impedance 311-1 is replaced in our invention by an actual port of the bridge. Thus, instead of the signal at the output of amplifier 309-1 of FIG. 3 (which corresponds to operational amplifier 101 of hybrid 110 shown in FIG. 1 of the instant disclosure) being attenuated between transformer 313-1 and matching impedance 311-1, that signal is supplied between transformers IA and IB of the instant disclosure, as shown in FIG. 1 and as discussed previously. Thus, one of the fundamental differences between the Lewis application and our conference bridge is in the recognition that the matching impedance 311-1 can be replaced by a second port, thereby allowing each hybrid to service a pair of stations.

CONCLUSION

Although a four-port bridge has been shown, the inventive aspects of our invention, as has been discussed above, can be extended to accommodate many additional ports. In addition, it should be noted that although transmission has been shown between telephone stations, SA, SB, SC and SD, these may be replaced by any other two-wire communication device without departing from the spirit and scope of our invention. Also, it is important to note that the values of the gains shown for each operational amplifier are relative to each other and should be selected so as to give a unity gain from the B terminal to the A terminal of a hybrid.

In the event that any port introduces loss, such loss can be compensated for by adjusting the gain of either or both amplifiers in the associated hybrid provided that balance between these amplifiers is maintained in the manner discussed above. In the event that port impedances of the two ports associated with each hybrid are not by design equal, the amplifier gains can be adjusted to eliminate unwanted feedback. Thus, where ZA does not equal ZB (where Z is the impedance of a port), gain through the amplifier, such as operational amplifier 103, of the associated hybrid must be ZA + ZB/ZB. In order to control the feedback transmission level, the gain from the output of operational amplifier 103 to the output of operational amplifier 101 via the direct path internal to hybrid 110 must be the same magnitude and opposite phase to the gain from the output of operational amplifier 103 via the summation amplifier 105 to the output of operational amplifier 101.

What is claimed is:

1. A conference bridge circuit for establishing substantially uniform transmission communication connections between four-ports of a bridge, said conference bridge comprising:

means for arranging said ports of said bridge into pairs, said means including means for connecting the ports of each pair of ports in series;

a pair of amplifying means associated with each of said pair of ports;

means for interconnecting each said amplifying means of each pair of amplifying means to form a two-wire to four-wire hybrid, said four-wire portion of said hybrid having an input terminal and an output terminal;

means for connecting said two-wire portion of each said hybrid to said associated series pair of ports;

means for permanently connecting said four-wire portions of each said hybrid together;

means for summing signals on the output terminals of said hybrids; and means for distributing said summed signals back to said hybrid input terminals.

2. The invention set forth in claim 1 wherein said hybrid is a four terminal device, and wherein said series pair of port connecting means includes:

a connection from one terminal of a first one of said ports to a first terminal of said hybrid; and a connection from a terminal common to both ports of said series pair of ports to a second terminal of said hybrid, said four-wire portion of said hybrid including an output bus and an input bus, and said four-wire permanent connection means including a connection from said fourth hybrid terminal to said output bus, a connection to said input bus, and a connection from a third hybrid terminal to said input bus.

3. The invention set forth in claim 2 wherein said amplifiers each have a noninverting positive input terminal, an inverting negative input terminal, and an output terminal, said hybrid further comprising:

a connection from said output of a first one of said amplifiers to said first terminal of said hybrid and to said negative terminal of said second amplifier;

a connection from said second terminal of said hybrid to said positive terminal of said second amplifier;

a connection from said output of said second amplifier to said fourth hybrid terminal and to said negative input terminal of said first operational amplifier; and a connection from said positive input terminal of said first amplifier to said third hybrid terminal.

4. The invention set forth in claim 3 whereby the gain from said negative terminal of each said amplifier to said amplifier output is a value $-n$, where $n$ is any positive number, and the gain from said positive terminal of each said amplifier to said amplifier output is a value of $+2n$.

5. A bridge circuit for interconnecting a plurality of two-wire communication devices, said bridge circuit comprising:

a plurality of hybrids, each hybrid adapted for converting from two-wire to four-wire operation, said four-wire portion of said bridge including an output bus and an input bus;

means for interconnecting said hybrids via said four-wire portion of said bridge, said interconnecting means including a summation means for communicating signals from said output bus to said input bus; and means for connecting each said hybrid to two of said communication devices together in series relationship, each said hybrid including two amplifiers arranged so that the output of each is connected to a first one of the inputs of the other, and further connected so that the output of a first one of said amplifiers at each of said hybrids and a second input to the second one of said amplifiers at each said hybrid are connected to said series combination of said associated communication devices, and said amplifiers at each said hybrid further connected such that said output of said second one of said amplifiers is connected to said output bus and said second input to said first amplifier at each of said hybrids is connected to said input bus.

6. The invention set forth in claim 5 whereby the gain via the direct path from said connection from said output of said second amplifier to said first amplifier output is equal in magnitude and opposite in phase to the gain via the path through said summation means from said output of said second amplifier to said first amplifier output.

7. The invention set forth in claim 6 whereby the output buses of all said hybrids are connected to said summation means and whereby an output of said summation means is connected to said input buses.

8. The invention set forth in claim 7 whereby said summation means comprises a passive network of resistors.

9. The invention set forth in claim 7 whereby said summation means comprises a summing amplifier.

10. The invention set forth in claim 5 whereby each said hybrid amplifier has associated therewith gain control means and said summation means has associated therewith gain control means so that the gain from one port of any hybrid to the ports associated with all other hybrids can be adjusted to a desired transmission level by adjusting the gains of one or more of said gain control means.

* * * * *